United States Patent [19]
Owen et al.

[11] 3,839,217
[45] *Oct. 1, 1974

[54] STABLE, POURABLE ALKALI METAL DITHIONITE DISPERSION

[75] Inventors: Robert M. Owen, Levittown; Henry L. Ramm, Newtown, both of Pa.

[73] Assignee: Rohm and Haas Company, Philadelphia, Pa.

[ * ] Notice: The portion of the term of this patent subsequent to Oct. 1, 1991, has been disclaimed.

[22] Filed: Jan. 9, 1970

[21] Appl. No.: 1,835

[52] U.S. Cl. ............................ 252/188, 8/37, 8/107, 423/515
[51] Int. Cl. .................. C01b 17/98, D21c 9/10
[58] Field of Search ............ 252/188; 8/34, 37, 107; 423/515

[56] References Cited
UNITED STATES PATENTS

| | | | |
|---|---|---|---|
| 795,755 | 7/1905 | Bazlen | 23/116 |
| 861,014 | 7/1907 | Bazlen | 23/116 |
| 2,995,522 | 8/1961 | Joyce | 252/188 |
| 3,054,658 | 9/1962 | Franklin et al. | 252/188 |
| 3,259,457 | 7/1966 | Sauls et al. | 252/188 |
| 3,265,459 | 8/1966 | Schober et al. | 8/34 |

FOREIGN PATENTS OR APPLICATIONS

| 7,397 | 1904 | Great Britain | 23/116 |
|---|---|---|---|

OTHER PUBLICATIONS

Diserens, Chemical Technology of Dyeing and Printing, 1948, Reinhold, pp. 33–39.

*Primary Examiner*—Carl D. Quarforth
*Assistant Examiner*—Irwin Gluck

[57] ABSTRACT

Water soluble metal dithionites (often called hydrosulfites or hyposulfites) are valuable reducing agents for many chemical reactions such as textile dyeing, but the material must either be anhydrous and stored under an inert vapor, or supplied as an aqueous solution, in which case the material has limited stability in that the active material spontaneously decomposes in a short period of time. The useful life of such solutions may be prolonged by refrigeration.

The present invention provides a fluent, homogeneous dispersion of a solid or crystalline zinc or alkali metal dithionite hydrate, the dispersion being physically stable and capable of storage for long periods without decomposition. The dispersing medium may be aqueous or nonaqueous and contains a material which suppresses dissolution of the dithionite solids.

12 Claims, No Drawings

STABLE, POURABLE ALKALI METAL DITHIONITE DISPERSION

The invention provides zinc or alkali metal dithionites or hydrosulfites in crystalline form as a pourable dispersion in a liquid. In accordance with a specific aspect of the invention, the dispersion may be stored for long periods of time in a quiescent state without decomposition thereof.

The metal dithionites are valuable reducing agents finding utility in many chemical reactions such as the vat dyeing of textiles.

The metal dithionites, sodium dithionite ($Na_2S_2O_4$) in particular, are prepared by precipitating the compounds from concentrated aqueous solutions thereof by "salting out" techniques using an organic compound such as methanol or ethanol in which the crystals are insoluble and a salt of an acid, particularly an inorganic acid, such as sodium chloride or sodium sulfate to achieve the object of recovering a solid product. Suitable methods of obtaining the crystals are described in U.S. Pat. Nos. 2,938,771 and 3,004,825. The conditions are controlled so as to grow an elongated crystal of a size which can be readily separated from the mother liquor by sedimentation or filtration.

Common average crystal sizes, which are grown for ease of separation, are crystals at least 320 microns long by at least 120 microns in thickness, a smaller proportion of larger and smaller particles being present. If allowed to settle in an aqueous sodium chloride brine containing ethanol or methanol to give a heterogeneous system, the crystal cake under the supernatant liquid is quite dense and hard packed and is not fluent; it even solidifies to a form resembling concrete, in time. Although the brine-alcohol supernatant liquid protects the cake from decomposition, the intractible sediment or filter cake is not a useful form of the product. Because aqueous solutions of the dithionite soon decompose and do not provide an economical way to ship the material, it has been common to dehydrate the sodium dithionite dihydrate crystals to obtain the anhydrous particles. When stored under a dry, inert gas, the anhydrous crystals are chemically stable for long periods. However, to use the material, the opening of the container exposes the contents to air and moisture, causing losses. Large quantities of aqueous solution cannot be made up for use over a long period of time because once decomposition starts, it proceeds rapidly by self-propagation (the decomposition products give an acid pH, which accelerates the decomposition).

It has now been found that by reducing the particle size of the crystals and/or introducing a suspending or thickening agent into a liquid, such as alcoholic brine, containing the crystals, it is possible to form a fluent, homogeneous, pourable dispersion of the solid dithionite particles, which is chemically and physically stable for long periods of time. It is essential that a material such as the salt in the brine and/or an alcohol be present which suppresses the dissolution of the dithionite.

The preferred particle size of the dispersed solid dithionite depends on the suspending medium and materials contained therein, and the viscosity of the dispersion. If there is no suspending or thickening agent in the dispersion, and it contains sayd 40 percent of a water miscible organic material such as methanol or ethanol, 15 percent of a salt such as sodium chloride, and 45 percent water, by weight, the maximum dimension of the particles of about 1 micron, and an average maximum dimension of the majority of the particles of about 0.6–0.8 microns are needed in order to obtain a suspension which is physically stable, i.e., which will not readily stratify to a nonfluent solids layer and a liquid layer. When an "average" particle size is referred to, the meaning intended is that the bulk of the particles are of approximately the specified size. As is well known, when crystals are precipitated or grown in bulk, there is normally a material variation in crystal size. The deviation from the average is inherent with a given crystal, temperature, etc.; accordingly, when an "average" size is referred to, it is intended that the inherent deviation be included.

A controlling factor as to useful particle sizes is the nature of the suspending medium. If an aqueous medium is thickened with methyl cellulose, polyvinyl alcohol, or other common thickening, dispersing, or suspending agents, it is possible to utilize and suspend much larger particles of zinc or alkali metal dithionite than if no such agent is used, as in the illustrative example given above where particles of less than 1 microns are suspended. Thus, particles having a maximum dimension of about 400 microns (e.g., crystals ranging in size from 20 by 50 microns, the dimenisons being thickness by length, to 160 by 400 microns), with the average being 120 by 320 microns, are suspended in accordance with the invention by means of a suitable suspending or thickening agent. In other words, the criticality of the particle size is such that, using thickening or suspending techniques in accordance with the invention, a pourable suspension is achieved.

The liquid suspending medium for the dithionite solids is preferably largely aqueous, the proportion of water therein being related to the nature and quantity of the suppressant of dissolution of the dithionite hydrate crystals or disintegrated crystals in the liquid. The material which suppresses dissolution of the dithionite particles may be a water soluble or miscible organic material, solid or liquid, or a water soluble inorganic compound, or both. Substantially any organic material which is a nonsolvent for the dithionite compounds and does not react therewith or catalyze the decomposition thereof is useful. Water miscible dissolution suppressants are preferred, but if the reducing compound is to be used in a nonaqueous environment, a water insoluble organic material such as the paraffinic or aromatic hydrocarbons, suitably thickened or diluted so as to be flowable, are useful. In this case, no salt suppressant of solubility need be used.

Examples of water soluble or substantially soluble organic compounds for suppressing dissolution of the dithionite are alkanols or polyols such as methanol, ethanol, propanol, ethylene glycol, propylene glycol, glycerine, isopropanol, water soluble ketones such as acetone, methyl ethyl ketone, and "Cellosolve" ethers such as methyl "Cellosolve" or any other organic suppressant including water soluble alkyl amines such as $C_{1-4}$ alkyl amines including triethylamine, which can also be used to modify the pH, and formamides and sulfoxides such as dimethyl sulfoxide and dimethyl formamide or any other liquid having a solubility in water or saturated brine of at least about 10 parts per 100 parts of water or brine by weight. The organic compound need not be a liquid at room temperature; soluble organic compounds which are ordinarily solids such as glucose, sucrose, or the suspending agent itself, such as the polysaccharide thickeners, exemplary of which is methyl cellulose, are useful as the inhibitor of dissolution of the solid dithionite. It is a simple matter to select useful organic compounds, the criteria being (1) inertness of the compound with respect to the dithionite, (2) the organic compound is a nonsolvent for zinc or sodium or other alkali metal dithionite, particularly the dihydrate thereof, and (3) it suppresses the dissolution of the particles in the liquid medium. One other criteria is of some importance, and that is the permeability of the liquid as to oxygen from the air; the lower the permeability the better. This does not mean that liquids having relatively high oxygen permeabilities are not useful, it simply means that they are less preferred embodiments of the invention. A thin layer of liquid such as kerosene, toluene, or the like may be maintained over the dispersion as an oxygen barrier in accordance with another aspect of the invention. Also, an inert gas atmosphere, such as nitrogen, may be used to displace air in the container. Even greater stability is possible with refrigeration, although it is not needed as with the solution form of the dithionites.

Similar criteria are applicable to the salt which functions to suppress dissolution of the solid dithionite hydrate. Its solubility in water should desirably exceed the solubility of the dithionite, it should be nonreactive therewith, and it must perform the salting out function. Since acids catalyze or otherwise induce decomposition of alkali metal dithionites, the salt obviously should give neutral or alkaline solutions; sodium bisulfite, one of the decomposition products of sodium dithionite, gives an acid reaction and is thus not useful, unless means to counteract its acid reaction is used. Any water soluble salt of any heavy metal, particularly those metals the sulfate of which is water soluble, or any water soluble salt of a metal of Group I or Group II of the periodic table or of ammonia is useful. Examples are sodium chloride, sodium bromide, the more soluble forms of sodium sulfate and sodium phosphate, sodium silicate, zinc sulfate, copper sulfate, ferrous sulfate, sodium acetate, sodium lactate, and ammonium chloride. Commonly sodium sulfite is present in solution and in the solids as a byproduct. The aqueous liquid most desirably should be saturated with respect to the salt used.

Of course, the end utility of the zinc or alkali metal dithionite must be kept in mind. Thus, the various components are selected so that they are compatible with the desired end procedure involved, such as dyeing or bleaching. It is important to subject each component to the simple scree ing tests noted above, i.e., to apply the criteria for selection of the components in the event there is doubt as to the usefulness of a given material.

The thickening and suspending agent is chosen for its suspending properties, fluidity at the temperatures encountered in shipping, storing, and using the suspension, inertness with respect to the dithionite, and in some cases its effect in suppressing dissolution of the dithionite. Useful thickening and suspending agents are well known to those skilled in the art. Polysaccharides, chemically modified polysaccharides, water soluble polymers, proteins of moderate molecular weight, which are water soluble or dispersible and have thickening properties are useful. Examples are the soluble cellulose ethers and polysaccharide gums such as carboxymethyl cellulose, methylhydroxypropyl cellulose, ethylhydroxyethyl cellulose, methyl cellulose, hydroxyethyl cellulose, hydroxypropyl cellulose, agar-agar, guar gu , mannogalactose, sodium alginate, gum tragacanth, gelatin, starch, hydroxyalkylated starch, polyvinyl alcohol and esters and ethers thereof, the soluble salts of polyacrylic acid, polymethacrylic acid, or polyitaconic acid, gelatin, bentonite and other colloidal clays, and so on. The end use must be kept in mind here too, the temperature having an effect on the viscosities of solutions of these materials.

The viscosity of the solids dispersion depends largely on the particle size, solids content, and level and type of thickening or suspending agent. Compositions having a Brookfield viscosity of up to 100,000 centipoises can be prepared, but 50,000 centipoises is about the maximum for pourability at room temperature, and even lower viscosities are preferred. At 30–45 percent solids content, viscosities of below about 15,000 and more preferably below about 10,000 centipoises at 20° to 25° C. (room temperature) are useful. For a wide range of temperatures, a pumpable dispersion at 30–45 percent solids is obtained at viscosities of below about 8,000 centipoises. The lower limit is not critical except as to its effect on obtaining a stable suspension of solids; i.e., one that remains flowable for long periods without agitation. At times, a very thin layer of supernatant liquid may separate from the still flowable suspension. This is not detrimental, and in fact it may be an advantage in that it provides a barrier to oxygen penetration and consequent product degradation.

As was stated above, the crystals as obtained are ordinarily diliberately grown to a size larger than is useful inthe invention in order to facilitate settling and complete recovery. These crystals are then ground by conventional means to obtain particles of a size useful in the invention. An alternative is to grow smaller crystals and recover them by centrifugal sedimentation, centrifugal filtration, and the like, to assist in getting the desired solids content and particle size.

As has been indicated above, the flowable dispersion should have a pH at least substantially neutral and preferably on the alkaline side. By a substan tially neutral pH is meant from about 6.5–7. The pH of any aqueous medium present desirably should be from 7 to 14, and preferably at about 9 or above. Suitable alkaline materials to achieve the desired pH include alkali metal and a monium hydroxides and carbonates, in particular sodium hydroxide and sodium carbonate, and water soluble amines. Suitable known buffers to maintain an alkaline pH are useful.

In storing and shipping the dispersion, it is best to avoid situations in which air is constantly circulated over an exposed surface of the dispersion. The container should be as full as is practicable. Tank cars should be sealed with only safety vents open. As is suggested above, a floating liquid layer to inhibit the penetration of air can be used; even materials relatively permeable to oxygen, such as toluene, being of use. Other advantageous procedures include the use of an inert gas such as nitrogen under superatmospheric pressure to discharge the vessels.

The invention provides substantial advantages over the prior art compositions of either an aqueous solution of the dithionite or anhydrous crystals thereof. The solution, being less concentrated, costs more to ship, and commonly requires the use of chemical stabilizers, such as those taughe by U.S. Pat. Nos. 3,045,658 and 3,287,276, an inert atmosphere, and most importantly, refrigeration, to maintain even short term stability. The present invention thus provides a conveniently utilizable form of alkali metal dithionite, and gives savings in anufacturing, shipping, and storing costs, as well as in reduced costs because of a major reduction in losses due to decomposition.

The following examples provide a description of the best modes presently contemplated of carrying out the invention. Unless otherwise stated, the dispersions are stored at about 20° C.

EXAMPLE 1

Sixteen pounds of sodium dithionite dihydrate crystals which are wet with a brine consisting of a saturated sodium chloride solution in aqueous ethanol are washed three times with 16 l pounds of saturated sodium chloride solution in 5 percent aqueous ethanol. A final 16 pound aliquot of this brine is added to the crystals and the pH is adjusted to 7.2 by the addition of solid sodium carbonate. The crystals are then ground from their original average siz e of 175 × 50 microns to an average size of 10 × 20 microns. The resulting slurry is then treated with 1 percent by weight of the total slurry of guar gum, thicknener (a water soluble mannogalactan polysaccharide thickener) and agitated for two hours. The resulting stable dispersion contains 34 percent sodium hydrosulfite by weight and has a Brookfield viscosity of 9,000 cps.

EXAMPLE 2

The procedure outlined in Example 1 is followed except that 5 percent hydroxyethyl cellulose was used as the thickener. The resulting dispersion has a Brookfield viscosity of 9,000 cps and contained 32 percent sodium hydrosulfite.

EXAMPLE 3

A mixture of 16 pounds of sodium dithionite dihydrate and 16 pounds of a saturated sodium chloride solution in 20 percent ethanol-water solution is ground from 175 × 50 microns to 10 × 20 microns. The resulting dispersion is treated with solid sodium carbonate to a pH of 8 and 1 percent of the thickener of Example 1 is added. The mixture is agitated for two hours to give a stable dispersion which has a Brookfield viscosity of 8,500 cps and which contains 32 percent sodium hydrosulfite.

EXAMPLE 4

The same procedure as is outlined in Example 1 is followed except that the pH is adjusted to 8 with solid sodium carbonate and then to 9 with 0.5N sodium hydroxide solution. The dispersion has the same characteristics as Example 1.

EXAMPLE 5

The same procedure as is outlined in Example 4 is followed except that 0.6% thickener is used. The resulting stable dispersion has a Brookfield viscosity of 7,000 cps.

EXAMPLE 6

Repeating Example 1 with potassium dithionite dihydrate gives similar results.

EXAMPLE 7

Using zinc dithionite hydrate in place of the sodium salt of Example 1 gives a similar product.

We claim:

1. A fluent homogeneous, pourable, chemically and physically stable dispersion of solid particles of a water soluble dithionite in a liquid which does not react therewith or catalyze the decomposition thereof, said liquid comprising a material which suppresses the dissolution of the particles in the liquid, the material being inert with respect to the dithionite and a nonsolvent therefor, the pH of the system being at least 6.5, the quantity of said material being such that the particles are not dissolved by said liquid an retain their particulate form, said solid particles constituting between about 20 percent and 45 percent by weight of said dispersion, the viscosity of said dispersion being below about 50,000 centipoises.

2. The composition of claim 1 in which the liquid comprises water, the dithionite is of zinc or an alkali metal in the solid hydrate form, and the suppressant comprises an organic compound.

3. The composition of claim 1 in which the liquid comprises water, the dithionite is of zincor an alkali metal in the solid hydrate form, and the suppressant comprises a water soluble salt of an acid, said salt being nonreactive with said dithionite hydrate.

4. The composition of claim 3 in which said salt is of a heavy metal, a periodic Group I or II metal, an amine, or ammonia and an inorganic acid.

5. The composition of claim 1 in which said liquid is water containing an organic liquid and an alkali metal or ammonium salt of an inorganic acid to suppress dissolution of the particles, the pH is alkaline, and the average maximum dinemsion of said particles is below about 320 microns.

6. The composition of claim 5 in which said dithionite is sodium dithionite dihydrate, said organic liquid comprises ethanol or methanol, said salt comprises sodium sulfate or sodium chloride, the viscosity is below about 15,000 centipoises, the maximum dimension of the particles is about 70 microns, and the average maximum dimension of the particles is below about 30 microns.

7. The composition of claim 6 in which a suspending agent is contained in aid liquid, and a buffer to maintain an alkaline pH is present.

8. In a method of storing and shipping zinc or alkali metal dithionite hydrate, the improvement of suspending finely divided particles thereof in a liquid which does not react therewith or catalyze the decomposition thereof, comprising a material which suppresses the dissolution of the particles in the liquid, the material being inert with respect to the dithionite and a nonsolvent therefor, and maintaining said particles in suspended form during storage and shipment thereof, the viscosity of the dispersion being below about 50,000 centipoises.

9. The method of claim 8 in which said liquid is water containing an alkanol and an alkali metal or ammonium salt of an inorganic acid.

10. A fluent homogeneous, pourable, chemically and physically stable dispersion of solid particles of a water soluble dithionite in a suspending medium including a liquid which does not react therewith or catalyze the decomposition thereof, said liquid comprising a material which suppresses the dissolution of the particles in the liquid, the material being inert with respect to the dithionite and a nonsolvent therefor, the pH of the medium being alkaline, the quantity of said material bein such that the particles are not dissolved by said liquid and retain their particulate form, said solid particles constituting between about 20 and 45 percent by weight of said dispersion, in which said liquid is water, said material being an organic liquid and an alkali metal or ammonium salt of an inorganic acid, said dithionite is sodium dithionite dihydrate, said organic liquid comprises ethanol or methanol, said salt comprises sodium sulfate or sodium chloride, the viscosity of the dispersion is below about 15,000 centipoises, the maximum dimension of the particles is about 70 microns, the average maximum dimension of the particles is below about 30 microns, a suspending agent is contained in the liquid, a buffer to maintain an alkaline pH is present, and said suspending agent is a conventional suspending agent selected from the polysaccharides, chemically modified polysaccharides, water soluble polymers, and proteins of moderate molecular weight.

11. The composition of claim 10 in which suspending agent is a cellulose ether of polysaccharide gum selected from carboxymethyl cellulose, methylhydroxypropyl cellulose, ethylhydroxyethyl cellulose, methyl cellulose, hydroxyethyl cellulose, hydroxpropyl, cellulose, agar-agar, guar gum, mannogalactose, sodium alginate, gum tragacanth, starch, and hydroxyalkylated starch.

12. The composition of claim 11 in which the suspending agent is guar gum.

* * * * *